United States Patent
Ramaswamy et al.

(10) Patent No.: US 6,900,828 B2
(45) Date of Patent: May 31, 2005

(54) FADE RESISTANT DIGITAL TRANSMISSION AND RECEPTION SYSTEM

(75) Inventors: Kumar Ramaswamy, Plainsboro, NJ (US); Paul Gothard Knutson, Lawrenceville, NJ (US); Jeffrey Allen Cooper, Rocky Hill, NJ (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/484,066

(22) PCT Filed: Jul. 19, 2002

(86) PCT No.: PCT/US02/23032

§ 371 (c)(1),
(2), (4) Date: Jan. 16, 2004

(87) PCT Pub. No.: WO03/009590

PCT Pub. Date: Jan. 30, 2003

(65) Prior Publication Data

US 2004/0162078 A1 Aug. 19, 2004

Related U.S. Application Data

(60) Provisional application No. 60/306,565, filed on Jul. 19, 2001.

(51) Int. Cl.[7] .............................. H04N 7/06; H04N 5/21
(52) U.S. Cl. .................. 348/21; 348/423.1; 348/425.2; 348/614; 348/607; 348/518; 348/729; 375/346; 375/240.27; 455/504; 455/512
(58) Field of Search .............................. 348/21, 423.1, 348/425.2, 425.4, 469, 470, 512, 515, 518, 729, 607, 608, 614, 624, 723, 725, 584, 586, 598, 599; 375/346, 240.27, 240.28; 370/535, 509; 455/445, 47, 501, 504, 512, 63.1, 67.13, 70, 570, 115.1; 386/98, 27, 33, 108, 109

(56) References Cited

U.S. PATENT DOCUMENTS

| | | | | |
|---|---|---|---|---|
| 5,430,485 A | * | 7/1995 | Lankford et al. | 348/423.1 |
| 5,565,924 A | | 10/1996 | Haskell et al. | 348/423 |
| 5,570,372 A | | 10/1996 | Shaffer | 370/108 |
| 5,742,732 A | * | 4/1998 | Kubo et al. | 386/95 |
| 6,072,832 A | * | 6/2000 | Katto | 375/240.28 |
| 6,122,015 A | | 9/2000 | Al-Dhahir et al. | 348/614 |
| 6,275,537 B1 | | 8/2001 | Lee | 375/240.2 |
| 6,388,717 B1 | * | 5/2002 | Seccia | 348/723 |
| 6,597,750 B1 | * | 7/2003 | Knutson et al. | 375/347 |
| 6,683,911 B1 | * | 1/2004 | Inoue | 375/240.26 |
| 6,744,815 B1 | * | 6/2004 | Sackstein et al. | 375/240 |
| 6,826,202 B2 | * | 11/2004 | Takashimizu et al. | 370/535 |
| 6,834,091 B2 | * | 12/2004 | Litwin et al. | 375/356 |

* cited by examiner

*Primary Examiner*—John Miller
*Assistant Examiner*—Jean W. Désir
(74) *Attorney, Agent, or Firm*—Joseph S. Tripoli; Joseph J. Laks; Ronald H. Kurdyla

(57) ABSTRACT

In a digital broadcast communications system, a higher priority component and a lower priority component are broadcast from a transmitter to a receiver. Each of these components generates a main and a supplemental signal, and each supplemental signal is advanced in time with respect to the corresponding main signal. The main and supplemental signals for both the higher and lower priority components are combined into a single signal, which is broadcast to a receiver. In the receiver, the time advanced supplemental signals are stored in a buffer to time align them with their corresponding main signals. Both main signals are processed in the normal manner in the receiver, and are also monitored to detect a fading event. When a fading event is detected, the corresponding buffered supplemental signals are substituted for the faded main signals and normal processing continues.

24 Claims, 4 Drawing Sheets

Transmitter

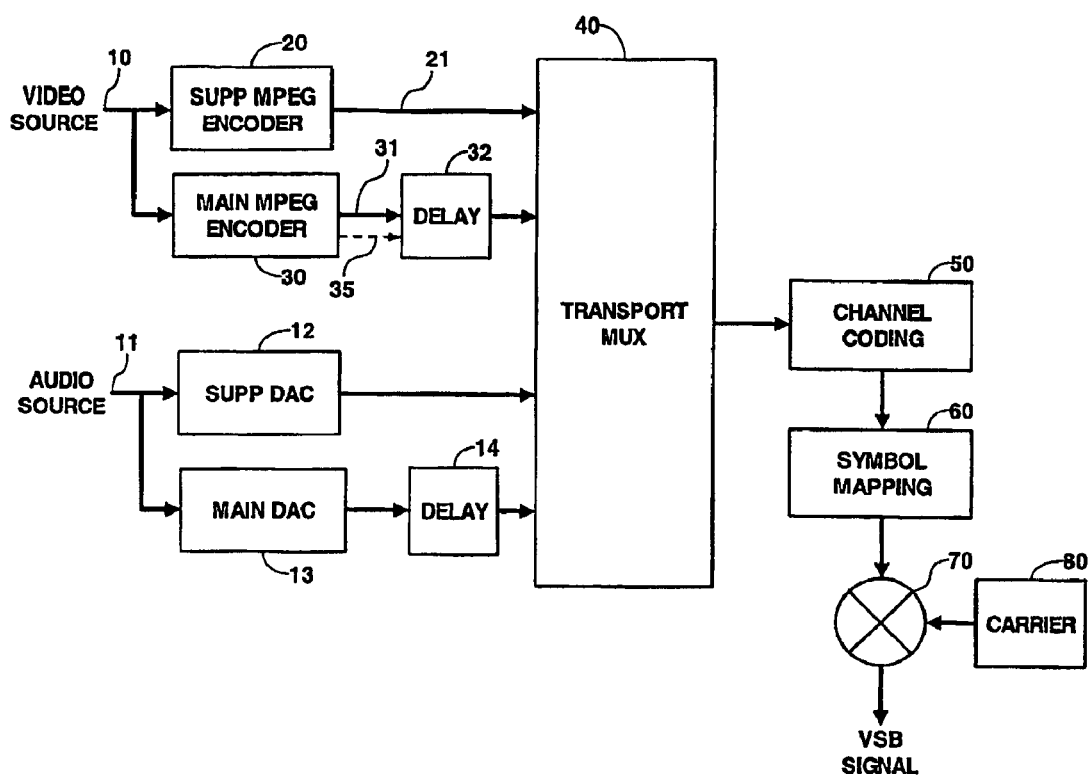
Fig. 1 – Transmitter

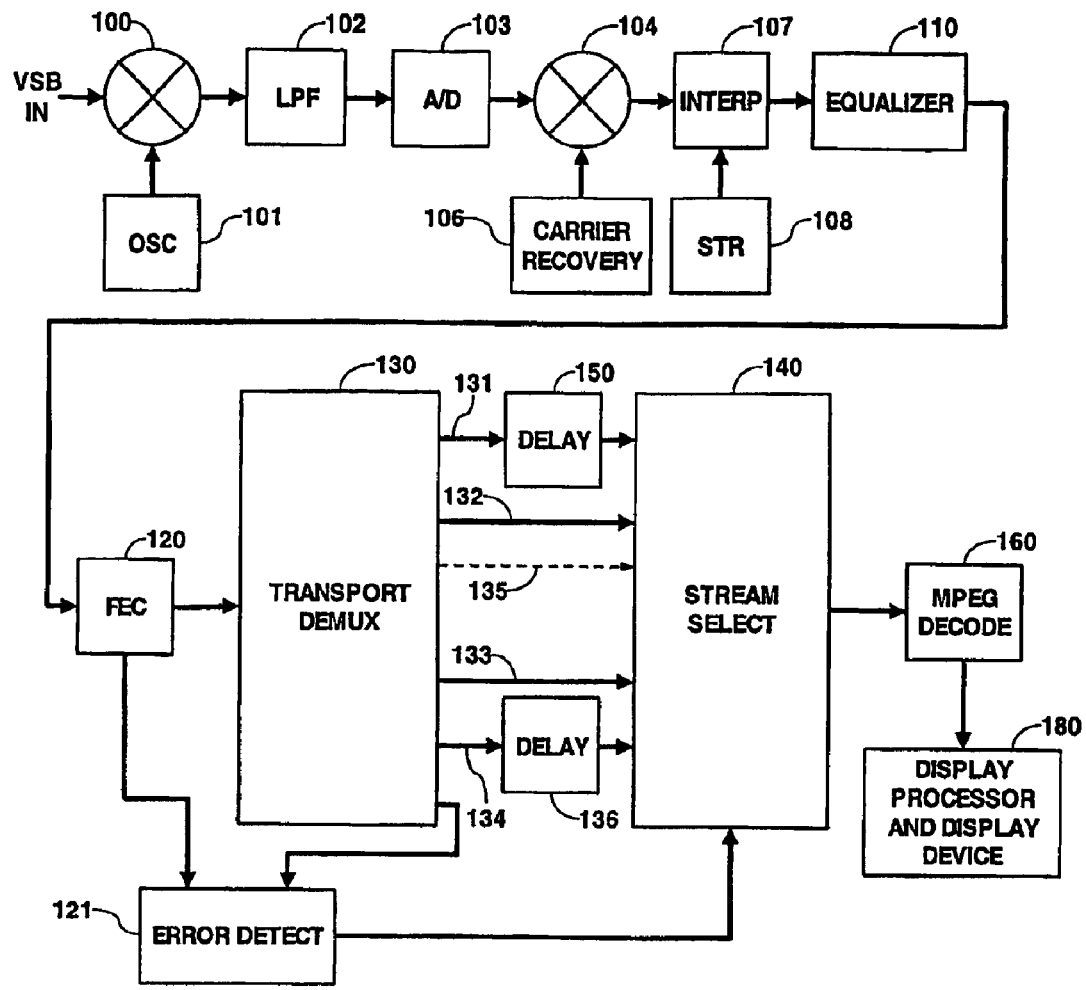
Fig. 2 – Receiver

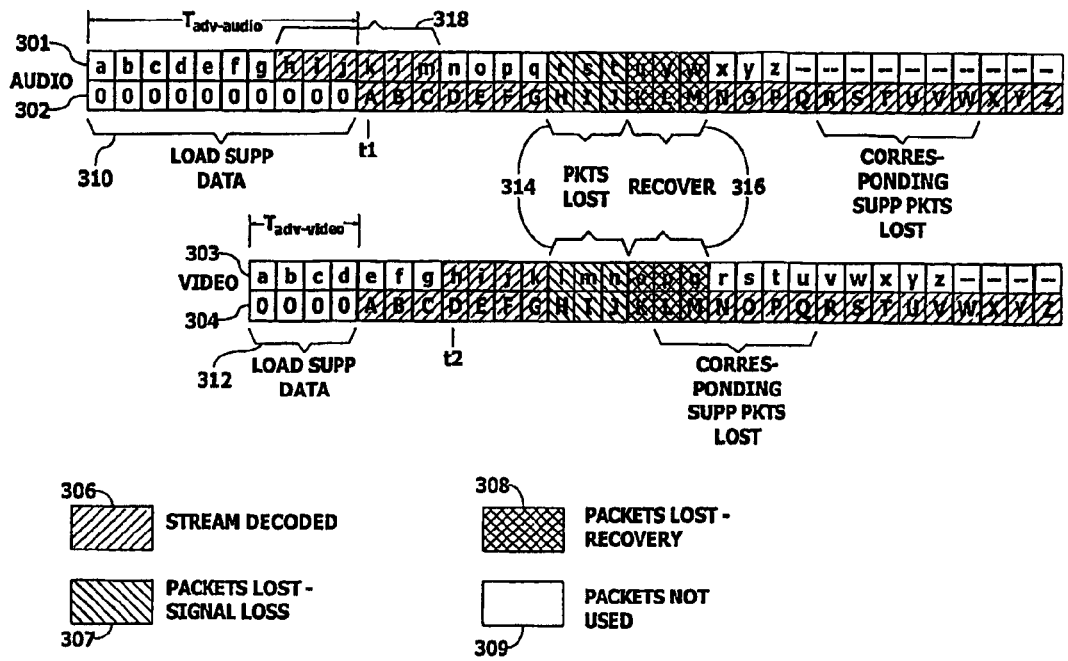
Fig. 3 – Different fade redundancies
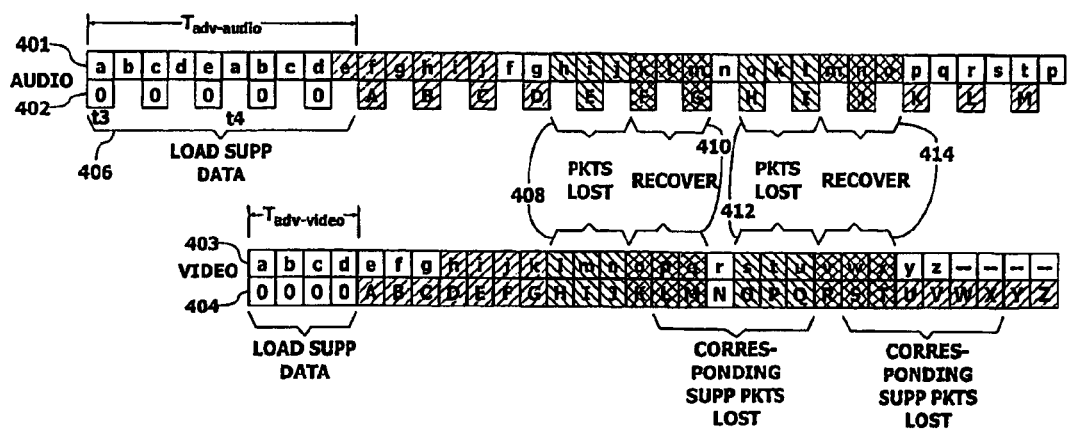
Fig. 4 - Extra audio redundancy

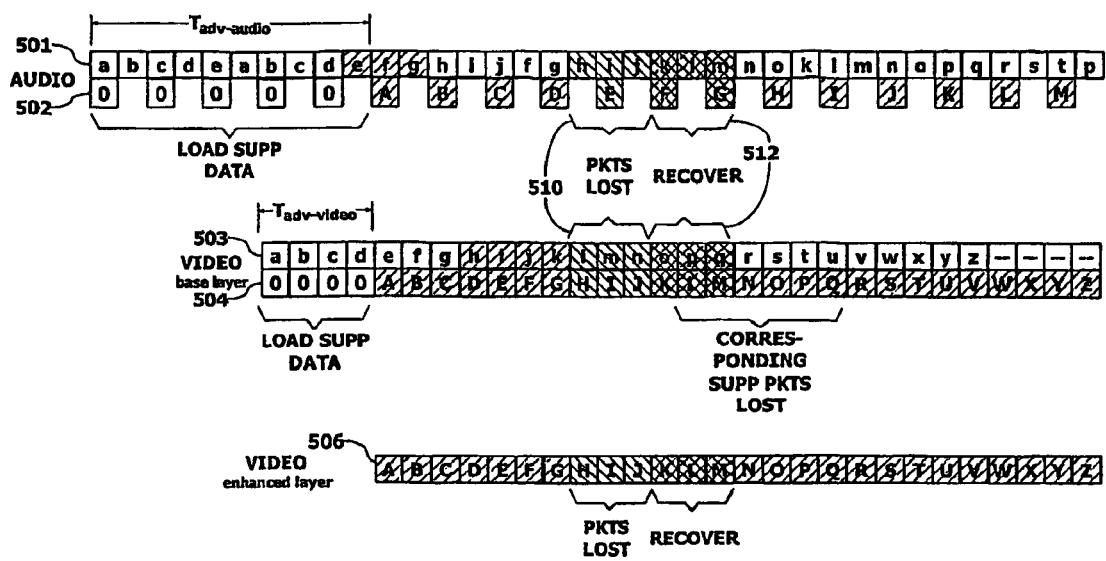
Fig. 5 - Scalable redundancy

FADE RESISTANT DIGITAL TRANSMISSION AND RECEPTION SYSTEM

This application claims the benefit under 35 U.S.C. §365 of International Application PCT/US02/23032 filed Jul. 19, 2002, which claims the benefit of U.S. Provisional Application No. 60/306,565, filed Jul. 19, 2001.

BACKGROUND

1. Field of the Invention

The present invention relates to an improved transmission and reception system for digital television. More particularly the present invention is provided to overcome any fading of signal that may occur between the transmission and reception of a digital terrestrial TV system.

2. Discussion of the Related Art

Any terrestrial TV system must overcome a number of problems in transmitting signals to a receiver. For example, the United States has adopted the Advanced Television System Committee (ATSC) system using eight level vestigial side band (8-VSB) as its digital television standard. Because the VSB system is a single carrier modulation system, it is susceptible to fading caused by multipath transmission and signal attenuation. These effects are well understood and the probability characteristics have been documented. If the fade is deep, wide and long enough in duration, the demodulation system in the TV receiver will lose synchronization and the signal will be lost. Such fading is particularly severe in mobile reception of the signal used in digital television.

Attempts have been made to correct signal fading that is frequency selective by using, for example, equalization techniques. However such techniques can result in degraded performance when fading occurs. Other techniques are not frequency selective.

One such solution to fading that has been presented is a "staggered multicasting" system which redundantly sends data in the digital communication system to avoid the fading characteristics in a particular channel. This system is described in provisional application, Ser. No. 60/(PU 010153) filed Jul. 19, 2001 by the same inventors as the present application. The contents of this provisional application are incorporated herein by reference. This application discloses repeating the data stream at a period approximately equal to or greater than the statistically expected fade period value. A problem remains, however, in how to organize the redundant data in such a system for optimum use.

Techniques are known that can vary the quality of service (QoS) and scalability characteristics of transmitted data. Such techniques are common in internet protocol streaming services, and rely on creating priorities in the network switches. QoS and scalability techniques may be very useful in switched network broadcast systems. Clearly, however, no such switch network is provided in the television broadcast medium. Lost data packets in the television broadcast system are not caused by traffic congestion, as in the internet, but rather by the lossy nature of the wireless channel.

The above mentioned provisional application discloses broadcasting redundant data in order to provide a level of guaranteed service. The level of redundancy provided in the bitstream directly affects the error robustness of the system.

In an audio/video broadcast system, the audio channel is normally protected more robustly than the video channel. That is, the viewer can accept a degraded video signal or even no video signal for a short time period. However losing the audio is more disturbing to the listener. Therefore, a higher QoS level should be placed on the audio channel. Other arrangements of QoS levels may be desired.

The present invention seeks to produce such a beneficial system by utilizing techniques that add additional robustness to a signal component or channel which has a higher perceived importance to the user (e.g. audio vis-a-vis video). For example, the maximum fade duration which is overcome by the redundant data stream can be longer for higher priority data than for lower priority data. The audio fade duration, for example, can be supported for a larger time period than that supported for the video. In this case, this will cause the delay buffer to be larger for the audio channel but since the data rate of audio is relatively small compared to video, it can be buffered for a low cost.

While the detailed description of the current invention below focuses on the details of the 8-VSB system, it must be recognized that the solution of the current invention is equally applicable to any digital broadcast transmission system that is subject to a fading channel environment.

SUMMARY OF THE INVENTION

In accordance with principles of the present invention, in a digital broadcast communications system, a higher priority component and a lower priority component are broadcast from a transmitter to a receiver. Each of these components generates a main and a supplemental signal, and each supplemental signal is advanced in time with respect to the corresponding main signal. The main and supplemental signals for both the higher and lower priority components are combined into a single signal, which is broadcast to a receiver. In the receiver, the time advanced supplemental signals are stored in a buffer to time align them with their corresponding main signals. Both main signals are processed in the normal manner in the receiver, and are also monitored to detect a fading event. When a fading event is detected, the corresponding buffered supplemental signals are substituted for the faded main signals and normal processing continues.

BRIEF DESCRIPTION OF THE DRAWINGS

FIG. 1 is a block diagram of a transmitter incorporating the principles of the present invention.;

FIG. 2 is a block diagram of a receiver incorporating the principles of the present invention;

FIG. 3 is an illustration of groups of audio and video packets with different fade redundancies;

FIG. 4 is an illustration of groups of audio and video packets with different fade redundancies as well as an extra audio redundancy; and FIG. 5 is an illustration of groups of audio and video packets illustrating audio plus scalable video with fade redundancies.

DETAILED DESCRIPTION

FIG. 1 is a block diagram of a transmitter incorporating the principles of the present invention. In the illustrated embodiment, the transmitter operates in accordance with the provisions of the Advanced Television Standards Committee (ATSC) digital television standard dated Sep. 16, 1995 which is incorporated herein by reference. However, one skilled in the art will understand that the principles of the present invention are applicable to any communications system in which the channel is subject to fading.

Video source material is applied via a terminal 10 to MPEG encoders 20 and 30. These encoders provide video signal encoding and compression in accordance with MPEG standards. The output from the encoder 20 is applied via conductor 21 to one input of a transport multiplexer 40. The encoder 30 processes the data stream in the same manner as encoder 20 but its output is applied via a conductor 31 to a packet buffer delay 32. The output of the delay 32 is applied to another input of the transport multiplexer 40. The video signal is encoded into respective digital data streams. The encoding can utilize known bit rate reduction methods and compression techniques which are appropriate for the particular signals involved. The compressed video data streams provided from the encoders 20 and 30 may also be divided into packets containing the encoded video information as well as data identifying each packet.

Audio signals are applied via a terminal 11 to a digital audio compressor (DAC)12. The digital audio compressor 12 processes the audio signals into digital signals as will be subsequently illustrated and the output thereof is applied to a further input of the transport multiplexer 40. From the terminal 11 the audio signals are also applied to a second digital audio compressor 13. The compressed data signals exiting the compressor 13 are applied to a delay circuit 14 and from there to a fourth input of the transport multiplexer 40.

The respective encoded video and audio signals are then multiplexed into a single data stream by the transport multiplexer 40. Additional data signals could also be supplied to the multiplexer 40 to provide e.g. control data subsequently utilized in the digital TV receiver.

The output from the transport multiplexer 40, containing the four sets of video and audio signals, is channel coded and modulated by the channel coding sections 50, the symbol mapping section 60 and the mixer 70 utilizing the carrier insertion circuit 80. These circuits also insert the various "helper" signals that will aid the 8-VSB receiver in accurately locating and demodulating the transmitted RF signals. These include the ATSC pilot, segment sync and frame sync signals.

The output signals from the mixer 70, modulated in the 8-VSB manner, are broadcast to receivers and appear in the form shown in FIG. 3. As has been indicated above, the audio signals are considered the higher priority signals while the video signals are considered the lower priority signals. In the upper portion of FIG. 3 the two audio or higher priority signals 301 and 302 are shown. As will be discussed below, the upper bitstream 301, encoded by encoder 12, is the supplemental stream which is sent in advance timewise with respect to the main audio signal 302, encoded by encoder 13 and delayed by delay circuit 14. In the lower portion of FIG. 3, two video or lower priority signals 303 and 304 are shown. As with the audio signals 301 and 302, the video signal 303, encoded by encoder 20, is considered the supplemental video signal while the video signal 304, encoded by encoder 30 and delayed in the delay circuit 32, is considered the main video signal.

The respective main and supplemental low priority video signals and the main and supplemental high priority audio signals are substantially identical to each other except that the main signals are delayed in time with respect to the supplemental signals. It is clear that this is accomplished for the video signals in the buffer 32 while the audio signals are delayed by the delay circuit 14 of FIG. 1.

Referring now to FIG. 2 a schematic diagram for a VSB receiver incorporating the principles of the present invention is illustrated. In the 8-VSB transmitted signal, the eight levels of the transmitted signal are recovered by sampling only the I-channel or in-phase information, in a known manner. In FIG. 2 the received signal is demodulated by reversing the processes that were applied in the transmitter. That is, the incoming VSB signals are received, downconverted, filtered and then detected. The segment sync and the frame sync are then recovered. This is accomplished by the mixer 100, the local oscillator 101, the low pass filter 102, the analog-to-digital converter 103, the mixer 104 and the carrier recovery circuit 106 as well as the interpolator 107 and the symbol timing recovery circuit 108.

The output of the interpolator 107 is applied to the equalizer 110. The segment sync signal aids in the receiver clock recovery while the field sync signal is used to train the adaptive ghost-canceling equalizer 110. One of the advantages of the VSB system is that complex equalization is not necessary since the equalizer operates only on the I-channel or real information.

The output of the equalizer 110 is applied to a forward error correction circuit (FEC)120. This circuit provides forward error correction signals which are applied to and utilized in a transport demultiplexer 130. The FEC circuit 120 also provides a signal to indicate that it was unable to properly decode its input signal. The outputs from the transport demultiplexer 130 mirror the inputs to the transport multiplexer 40 in the transmitter illustrated in FIG. 1. These signals include the supplemental video signal on conductor 131, the main video signal on conductor 132, the main audio signal on conductor 133 and the supplemental audio signal on conductor 134.

The supplemental video or low priority signal is applied to a buffer delay 150 having a delay which equals the delay of the buffer 32 in the transmitter while the main video signal is applied on conductor 132 directly to a stream select circuit 140. Similarly the main high priority or audio signal is applied on conductor 133 directly to the stream select circuit 140 while the supplemental audio signal is applied to a delay circuit 136 having a delay equal to the delay of the delay circuit 14 in the transmitter. The delayed supplemental video signal is applied from the buffer 150 to the stream select circuit 140 while the delayed supplemental audio signal is applied from the delayed circuit 136 to the stream select circuit 140. Consequently, the main and supplemental signals for both the audio high priority and video low priority signals are applied to the stream select circuits aligned in time.

The stream select circuit 140 normally selects as outputs one of the respective main and supplemental audio and video signals to be supplied to the decoder 160 for application to the display processing circuits and display device 180.

If a fading event occurs, the buffered supplemental signals will be selected by the stream select circuit 140. Such a fading event is determined by the error detector circuit 121 connected to respective outputs of the forward error correction circuit 120 and the transport demultiplexer 130. The occurrence of a fading event in either the main high priority signal or the main low priority signal may be detected by a number of different possible measures in the physical layer. More specifically, a measure of the signal quality of the received signal may be monitored to detect a fading event. For example a signal-to-noise ratio detector may be used which will detect a decrease in the signal-to-noise ratio should the amplitude of the processed main signals decrease. Alternatively, the bit error rate of the received signal may be monitored to detect if it drops below a predetermined level, or the packet error signal from the FEC 120 may be monitored to detect any undecodable packets. One or more of these indications may be monitored by the error detection circuit 121 to detect a fading event. When the circuit 121 determines that the main signal is corrupt it instructs the stream select circuit 140 to utilize the supplemental channel data.

The supplemental data will continue to be used until either the respective buffer is exhausted or the receiver recovers and the main channel is restored to above its threshold. It is evident that once the VSB receiver recovers it must stay recovered long enough to permit the supplemental buffer to refill to be prepared for another fade event in the respective main stream signal. The size of the buffered delays of 150 and 136 can be based on the expected fade duration of the respective high and low priority signals. For example such delay can be between 5 ms and a few seconds.

Referring once again to FIG. 3, these illustrations indicate different video and audio fade duration redundancies in the design. FIG. 3 is a time diagram illustrating the timing of packets transmitted through the communications channel. In the supplemental audio signal 301, a first packet is labeled 'a', a second packet is labeled 'b', and so forth. During the time period 310, the audio packet buffer 150 is loaded with the initial supplemental audio packets. It can be seen that the supplemental audio signal 301 has been advanced in time about ten data packets when compared to the main audio signal 302, thus, during time period 310 audio packets 'a'–'j' are loaded into buffer 150. In a similar manner, during time period 312 supplemental video signal 303 packets are loaded into buffer 136. However the supplemental video signal 303 has been advanced in time only about four data packets with respect to the main video signal 304.

At time t1, the first main audio packet 'A', corresponding to supplemental audio packet 'a', is received. Audio packet 'A' is followed by the next main audio packet 'B', corresponding to supplemental audio packet 'b', and so forth. Similarly, at time t2, the first main video packet 'A', corresponding to supplemental video packet 'a', is received, followed by the next main video packet is 'B', corresponding to supplemental video packet 'b', and so forth. In the normal mode of operation, the main audio and main video packets are selected by the signal selector 140 and processed by the subsequent receiver circuitry.

Time period 314 represents a fading event lasting for a three packet time intervals. During time interval 314, main audio packets 'H, 'I' and 'J', main video packets 'H', 'I' and 'J', supplemental audio packets 'r', 's' and 't', and supplemental video packets 'l', 'm' and 'n' are all lost. Time period 316 represents a time interval where the signal is back to full strength and the receiver is reacquiring the signal, i.e. the demodulator chain is resynchronizing and the forward error correction circuitry is recovering. During time interval 316, main audio packets 'K', 'L' and 'M', main video packets 'K', 'L' and 'M', supplemental audio packets 'u', 'v' and 'w', and supplemental video packets 'o', 'p' and 'q' are all lost.

Because the audio buffer 150 contains 10 supplemental audio packets, the supplemental audio packets 'h'–'m', transmitted during time interval 318 in advance of the corresponding main audio packets 'H'–'M' and before the fading event 314–316, are in the audio packet buffer 150 at the time of the fading event 314–316. Thus, the six main audio packets 'H'–'M' lost in the fading event can be recovered by using the supplemental audio packets 'h'–'m' from the audio packet buffer 150. However, because the video buffer 136 contains only four supplemental video packets, transmitted in advance of the main video packets, the video channel is only partially protected. That is, the fade duration of six packets is greater than the four packet advance of the video supplemental signal. Therefore, the video data packets 'L' and 'M' of signal 304 will be lost and no corresponding supplemental packets are available to replace them. As has been noted above, the delay buffer in the audio channel is larger than the delay buffer in the video channel. However since the data rate of audio is relatively small compared to video, the extra buffering of the audio signal has a relatively low cost.

Shadings are provided in FIG. 3 to aid in understanding the drawings. Thus the shading 306 indicates the packets decoded at the receiver, shading 307 indicates packets lost due to the fading event. The shading 308 indicates packets lost due to the receiver re-acquisition and the lack of shading shown in 309 are indicative of packets which are received but not used.

It should be clear that, after a fading event, the overall system is vulnerable to fades until the supplemental buffers that have been used have been repleted. This is because all the streams can be lost in the fade. Additional advanced supplemental streams might be used to ride out multiple close successive fades. This however will consume more bandwidth.

Referring now to FIG. 4, an example is shown wherein the audio channel has the same maximum fade duration as that in FIG. 3. The video data streams 403 and 404 are substantially the same as that shown in FIG. 3. However the audio supplemental channel 401 has two copies of each packet in the main audio channel 402. That is, for each main audio packet, e.g. 'A', two corresponding supplemental packets, e.g. 'a', one received at time t3 and a second one at time t4, are received and stored in the audio buffer 150. There are still ten supplemental audio packets stored in the buffer 150, received during time period 406.

In the example of FIG. 4, two fading events happen relatively close to each other. The first includes a fade at time period 408 and receiver recovery period at time period 410, and the second includes a fade at time period 412 and receiver recovery period at time period 414. It can be seen that in the main video signal 404 some packets, e.g. 'h'–'k' are made available from the secondary video signal 403. However both the fade duration and the two fades in a row have created lost packets, e.g. 'L', 'M', 'O', 'P', 'Q', 'S', 'T', in the video. In the audio channel however the two copies of audio data packets arranged in the supplemental channel 401 enable the receiver to recover all of the missing data due to both fades. It should be noted that in the arrangement shown in FIG. 3 if two fades such as those of FIG. 4 occurred, the audio channel would not have survived without loss. It is clear, therefore, that having multiple copies of the audio channel packets in the supplemental signal is highly advantageous. Again as noted above this is available at relatively low additional cost because the data rate of audio is relatively small compared to that of video.

It should be noted that in the arrangement of FIG. 4, the maximum distance between any two redundant packets still defines the longest fade time. However with additional redundant packets the multiple fade events can also be concealed in the high priority signal stream.

The same principles discussed above can be utilized to help protect the video channel. Scalable encoding in the video channel can provide a graceful degradation characteristic. The specific type of scalable encoding is not essential. It could be spatial, temporal, SNR, or fine grain scalability. Scalable video coding involves creating two separate video bitstreams: a base layer including data needed to form an image with the lowest acceptable quality; and an enhancement layer including data which, when combined with the base layer data, creates a higher quality image. If the base layer is protected with redundancy for fades while the enhancement layer has no such redundancy then a graceful degradation is provided from a higher quality image to a lower quality image when a fading event occurs. One skilled in the art will understand that more than two layers of video may be generated and encoded for differing fade event durations according to principles of the present invention.

In FIG. 1, the main video signal generated by the encoder 30 includes both the base layer information over line 31 and enhancement layer information, illustrated by the dotted line 35, while the supplemental video signal generated by encoder 20 includes only base layer information over line 21. Similarly, in FIG. 2, the enhancement layer information from the main video signal, shown as dotted line 135, is applied to the stream selector 140 in the same manner as the base layer information from the main video signal on conductor 132, while only base layer information for the supplemental video signal is supplied to the delay circuit 150. Therefore, the enhancement layer information is in time synchronism with the main base layer information. Consequently, under normal conditions, a higher quality image may be produced from the base layer and enhancement layer information of the main video signal.

FIG. 5 illustrates signals produced by such a system. The audio channels 501 and 502 are substantially the same as 401 and 402 of FIG. 4. However, the video channels 503 and 504 relate only to the base layer information. That is, in FIG. 5, the base layer main video signal 504 has fade duration redundancy of four packet duration due to the addition of a corresponding time advanced base layer supplemental video signal packet stream 503. However, the enhancement video layer 506 does not have a corresponding supplemental packet stream, and therefore has no fade redundancy. In the arrangement shown in FIG. 5 the fading event at time interval 510 and the recovery period at time interval 512 causes the loss of packets 'L' and 'M' from the base layer video data and all of packets 'H'–'M' from the enhancement layer 506. The audio signal does not lose any packets. Consequently, the high resolution video will be degraded down to base layer resolution during most of the fading event, but a picture is still provided during that portion and the audio is still decoded properly. As noted above it is loss of audio that will be most noticed by a viewer of television. The viewer can accept some degradation in the video without causing any problems.

It is clear from the above examples that many different arrangements are possible. The tradeoff must be made between the duration of the fade and the size of the buffer used. Also the bit rate must be traded off with the redundancy. Clearly if more redundancy is used, then fewer bits are available for the application. The method and apparatus described above provides different fade duration redundancies for different bitstreams to create levels of QoS on a wireless lossy channel. That is, higher priority audio data is given higher level of fading event resistance than the lower priority video data. Additional redundancy may be provided to further protect high priority data, e.g. audio data, from successive fades. The application of staggered multicasting to scalable video bitstreams create graceful degradation during fading events as illustrated in the bitstream illustration in FIG. 5. While the present invention has been described with respect to particular embodiments and particular illustrative examples, it is evident that the principles of the present invention may be embodied in other arrangements without departing from the scope of the present invention as defined by the following claims.

What is claimed is:

1. A method for improving the reception of a transmitted signal comprising the steps of:
    producing a main set and a supplemental set of high priority data from a first source in a transmitter;
    delaying said main set of high priority data in time with respect to said supplemental set of high priority data;
    producing a main set and a supplemental set of low priority data from a second source;
    delaying said main set of low priority data in time with respect to said supplemental set of low priority data;
    transmitting a signal carrying said main and delayed supplemental sets of both said high priority and low priority data for reception by a receiver;
    applying said main set of high priority data received in said receiver to normal high priority data reception channels of said receiver;
    storing said supplemental set of high priority data received in said receiver in a buffer for high priority data in said receiver;
    applying said main set of low priority data received in said receiver to normal low priority data reception channels in said receiver;
    storing said supplemental set of low priority data received in said receiver in a buffer for low priority data in said receiver;
    detecting an undesired change in said transmitted signal;
    substituting corresponding portions of said supplemental high priority signal stored in said buffer for any undesirably changed portions of said main high priority signal; and
    substituting corresponding portions of said supplemental low priority signal stored in said buffer for any undesirably changed portions of said main low priority signal.

2. A method as claimed in claim 1 wherein said transmitted signal is transmitted in the form of a VSB signal.

3. A method as claimed in claim 1 wherein said main set of high priority data is delayed for a longer time period than said main set of low priority data.

4. A method as claimed in claim 1 wherein said high priority data is audio signal data and said low priority data is video signal data.

5. A method as claimed in claim 4 wherein said supplemental set of audio signal data contains multiple copies of said main audio signal data.

6. A method as claimed in claim 5 wherein said supplemental set of audio signal data contains two copies of said main audio signal data.

7. A method as claimed in claim 4 wherein the low priority data is composite video signal data having both a base layer and an enhancement layer and wherein said supplemental set of video signal data contain only said base layer and the main set of video data contains both the base layer and the enhancement layer.

8. A method as claimed in claim 7 further comprising the step of combining said received enhancement layer of said video signal data with said received base layer of said video signal data to restore the composite video signal data in said receiver.

9. A method as claimed in claim 1 wherein said undesired change in said received signals is related to a quality of said received signal and said change is detected by monitoring a quality measure of said received signal.

10. A method as claimed in claim 9 wherein said quality measure is one or more of a signal-to-noise ratio, bit error rate or packet error rate measure.

11. A method for improving the reception of a signal carrying a first set of synchronously encoded first priority signals and a second set of synchronously encoded second priority signals, said second priority being lower than said first priority, each of said first and second sets containing a main signal and a supplemental signal, said main and supplemental signals being staggered in time with each said supplemental signal being in advance of the corresponding said respective main signal, said supplemental signal of said first priority signal being advanced by a larger time interval than said supplemental signal of said second priority signal, comprising the steps of:

storing each of said supplemental signals in respective buffers in said receiver;

processing each of said main signals in said receiver in a normal manner;

detecting an undesired change in the received signal; and substituting corresponding portions of said stored supplemental signals for any undesirably changed portions of said main signals.

12. A method as claimed in claim 11 wherein the received signal is a VSB modulated signal.

13. A system for improving the reception of transmitted signals comprising:

means for producing a main and a supplemental set of high priority data from a first source in a transmitter;

first delay means for delaying said main set of high priority data in time with respect to said supplemental set of high priority data;

means for producing a main and a supplemental set of low priority data from a second source;

second delay means for delaying said main set of low priority data in time with respect to said supplemental set of low priority data;

means for transmitting a signal carrying said main set and said delayed supplemental set of both the high and low priority data;

a receiver having respective normal receiving channels for low and high priority data;

means for applying said main set of high priority data received in said receiver to said normal high priority receiving channel of said receiver;

a first buffer circuit for high priority data in said receiver;

means for storing said supplemental set of high priority data received in said receiver in said first buffer circuit;

means for applying said main set of low priority data received in said receiver to said normal low priority receiving channel in said receiver;

a second buffer circuit for low priority date in said receiver;

means for storing said supplemental set of low priority data received in said receiver in said second buffer circuit;

detector circuits in said receiver for detecting any undesired changes in received signal;

means in said receiver for substituting corresponding portions of said supplemental set of high priority data stored in said first buffer circuit for any undesirably changed portions of said main set of high priority data; and means in said receiver for substituting corresponding portions of said supplemental set of low priority data stored in said second buffer circuit for any undesirably changed portions of said main set of low priority data.

14. A system as claimed in claim 13 wherein the transmitting means comprises circuitry for transmitting a VSB signal carrying said main set and said delayed set of both the high and low priority data.

15. A system as claimed in claim 13 wherein said first delay means provides a longer time delay than said second delay means.

16. A system as claimed in claim 13 wherein said high priority data is audio signal data and said low priority data is video signal data.

17. A system as claimed in claim 16 wherein said supplemental audio signal data contains multiple copies of said main audio signal data.

18. A system as claimed in claim 17 wherein said supplemental audio signal data contains two copies of said main audio signal data.

19. A system as claimed in claim 16 wherein said video signal data produced in said transmitter is a composite video signal data having both a base layer and an enhancement layer and wherein said main and supplemental sets of video signal data both contain said base layer of said composite video signal data and the main set of video signal data further contains the enhancement layer.

20. A system as claimed in claim 19 wherein combining means in said receiver combines said enhancement layer of said video signal data with said base layer of said first video signal to restore said composite video signal data in said receiver.

21. A receiver for improving the reception of signals transmitted in the form of a first set of synchronously encoded first priority signals and a second set of synchronously encoded second priority signals, said second priority being lower than said first priority, each of said first and second sets containing a main signal and a supplemental signal, said main and supplemental signals being staggered in time with said supplemental signal being in advance of said respective main signal, said receiver comprising:

a first buffer circuit for storing said supplemental signal of said first priority signals received in said receiver;

a second buffer circuit for storing said supplemental signal of said second priority signals received in said receiver;

signal processors for processing each of said main signals received in said receiver in a normal manner;

a detector circuit for detecting any undesired change is said received signal; and means coupled to said detector circuit and said first and second buffer circuits for substituting corresponding portions of said stored supplemental signals for any undesirably changed portion of said respective main signals.

22. A receiver as claimed in claim 21 wherein said received signal is a VSB modulated signal.

23. A receiver as claimed in claim 21 wherein said undesired change in said received signal is related to a quality of said received signal and said detector circuit monitors a quality measure of said received signal.

24. A receiver as claimed in claim 23 wherein said quality measure is one or more of a signal-to-noise ratio, bit error rate or packet error rate measure and the detector monitors one or more of a signal-to-noise ratio, bit error rate or packet error rate measure.

* * * * *